United States Patent
Solh et al.

(10) Patent No.: US 10,504,240 B1
(45) Date of Patent: Dec. 10, 2019

(54) DAYTIME HEATMAP FOR NIGHT VISION DETECTION

(71) Applicant: Amazon Technologies, Inc., Seattle, WA (US)

(72) Inventors: Mashhour Solh, San Jose, CA (US); Manik Gupta, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 82 days.

(21) Appl. No.: 15/787,527

(22) Filed: Oct. 18, 2017

(51) Int. Cl.
 *G06T 7/20* (2017.01)
 *H04N 5/235* (2006.01)
 *G06T 7/80* (2017.01)
 *G06T 5/40* (2006.01)

(52) U.S. Cl.
 CPC ............. *G06T 7/80* (2017.01); *G06T 5/40* (2013.01); *H04N 5/2353* (2013.01); *G06T 2207/10016* (2013.01); *G06T 2207/10048* (2013.01)

(58) Field of Classification Search
 USPC ........ 382/103, 115–118, 155, 159, 165, 181, 382/273–275; 358/527
 See application file for complete search history.

(56) References Cited

U.S. PATENT DOCUMENTS

| | | | | |
|---|---|---|---|---|
| 8,687,078 B2 * | 4/2014 | Bigioi | ................ | G06K 9/00288 348/222.1 |
| 2004/0175021 A1 * | 9/2004 | Porter | ................ | G06K 9/00228 382/118 |
| 2006/0102843 A1 * | 5/2006 | Bazakos | ............ | G06K 9/00255 250/339.05 |
| 2007/0133885 A1 * | 6/2007 | Jeong | ................. | G06K 9/00369 382/228 |
| 2010/0272363 A1 * | 10/2010 | Steinberg | ........... | G06K 9/00228 382/190 |
| 2011/0228117 A1 * | 9/2011 | Inoue | ................. | G06K 9/00228 348/222.1 |
| 2014/0270374 A1 * | 9/2014 | Unzueta | ............. | G06K 9/00248 382/103 |
| 2017/0116464 A1 * | 4/2017 | Shinohara | .......... | H04N 5/23219 |
| 2017/0257576 A1 * | 9/2017 | Mitsui | .................... | H04N 5/272 |

OTHER PUBLICATIONS

U.S. Appl. No. 15/601,752, filed May 22, 2017, Titled: Presence Detection and Detection Localization.

* cited by examiner

*Primary Examiner* — Dwayne D Bost
*Assistant Examiner* — Stephen M Brinich
(74) *Attorney, Agent, or Firm* — Kilpatrick Townsend & Stockton LLP

(57) ABSTRACT

A computer-implemented method includes receiving an image frame of image data associated with a camera. The method also includes receiving a human presence heatmap for the image frame, receiving a motion heatmap for the image frame, and receiving an image metric heatmap for the image frame. The method further includes receiving a combined heatmap as a combination of the human presence heatmap, the motion heatmap, and the image metric heatmap and setting auto-exposure parameters for the camera based on the combined heatmap.

20 Claims, 8 Drawing Sheets

DAYTIME HEATMAP FOR NIGHT VISION DETECTION

BACKGROUND

With the advancement of technology, the use and popularity of electronic devices has increased considerably. Electronic devices are commonly used to capture and process image data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cameras can operate in multiple modes: a visible imaging mode, which can be referred to as a red-green-blue (RGB) mode, and an infrared (IR) imaging mode. In the IR imaging mode, IR illumination can be provided by one or more IR illumination sources for the camera (e.g., a set of IR light emitting diodes (LEDs)) that can be positioned adjacent the imaging elements of the camera. If a reflective object is placed close to the camera, a strong reflection can be produced in the region of the image associated with the reflective object. Conventional auto-exposure algorithms will attempt to avoid saturation due to the strong reflection in the region of the image associated with the reflective object, resulting in low contrast for other regions of the image. The low contrast in the resulting image will impair visibility for a user as well as the functionality of computer vision detection algorithms (e.g., motion and human detection).

To address these shortcomings in conventional cameras, embodiments of the present disclosure construct a heatmap using one or more RGB images and use the resulting heatmap to set the auto-exposure parameters that are used by the camera in the IR imaging mode. The heatmap can be implemented as a weighted average that emphasizes the regions of the image frame that include motion and/or are associated with presence of people, which can be referred to as regions of interest. The heatmap enables the auto-exposure parameters to be set in a manner that provides predetermined levels of contrast in the regions of interest when the camera is operating in an IR imaging mode. As described herein, the heatmap can be constructed when the camera is operating in the RGB mode and can be updated, for example, throughout the day. Additionally, in some embodiments, the heatmap can be updated when the camera is operating in the IR imaging mode.

Figure 1:
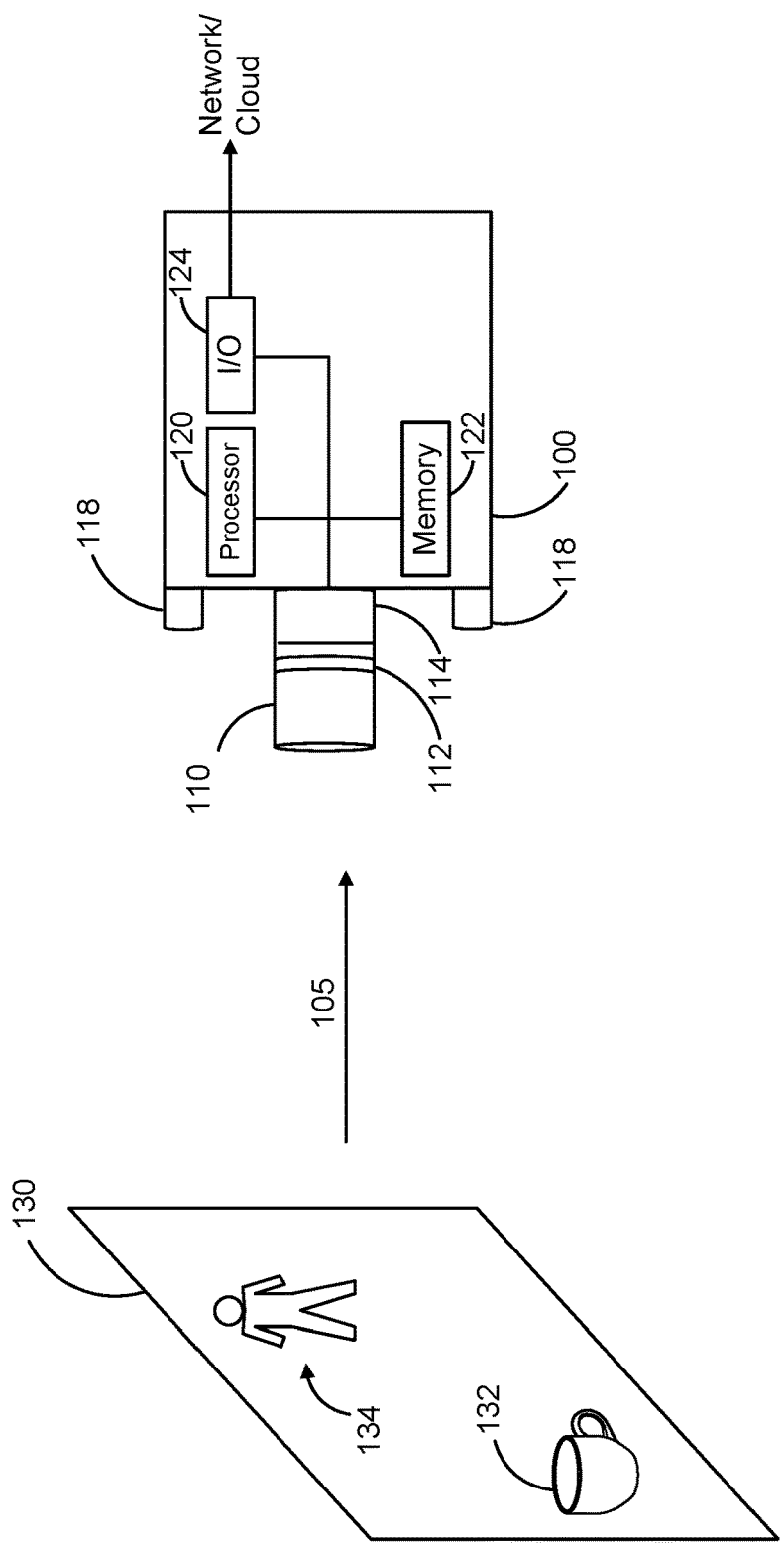
FIG. 1 is a simplified schematic diagram of a camera system according to examples of the present disclosure.

FIG. 1 is a simplified schematic diagram of a camera system according to examples of the present disclosure. The camera system 100 includes an optical imaging lens 110, an IR filter 112, an image sensor 114, and illuminations sources 118. The IR filter 112, which can be removed from the optical path aligned with the optical axis, for example, mechanically or electrically, can be utilized in conjunction with the IR imaging mode. In some embodiments, the illumination sources 118, which can include one or more IR LEDs, are positioned such that they circumferentially surround the image sensor 114. The camera system also includes a processor 120 and a non-transitory data storage device 122 (e.g., memory) in communication with the processor 120. The data storage device 122 may be or include any suitable type of volatile or non-volatile data storage device including, for example, flash memory, random access memory, disk-based storage, etc. The camera system further includes I/O interface 124, which can be communicatively coupled to one or more networks and/or the cloud. The one or more networks and/or the cloud can provide back-end services/servers that can, in conjunction with processor 120, or in a stand-alone manner, perform the methods described herein, including generating the heatmaps described herein, combine heatmaps to form combined heatmaps, derive values utilized in setting auto-exposure parameters, and the like.

Storage media or computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

Light enters the camera system 100 along optical axis 105 and the imaging plane of the image sensor 114 is substantially perpendicular to the optical axis 105. During operation in RGB mode, ambient light illuminates objects in the field of view of the camera and these objects are imaged using the image sensor 114. As an example, the field of view of object plane 130, which can be imaged on the image plane of the image sensor 114, includes a coffee mug 132, which can be placed close to the camera and fills a significant portion of the lower left portion of the field of view. Object plane 130 also includes a person 134 in an upper right portion of the field of view. Although an object plane 130 is illustrated in FIG. 1, it will be appreciated that items at different distances from the camera system can be imaged and use is not limited to objects lying in a single plane. One of ordinary skill in the art would recognize many variations, modifications, and alternatives.

During operation in RGB mode, the ambient light illumination, which generally illuminates objects in a diffuse manner, enables operation of computer vision (CV) detection algorithms, which, for example, can detect the presence of humans or other animals, can detect motion in the field of view, or the like. Additionally, auto-exposure (AE) algorithms can operate using image data captured during RGB mode, thereby setting the exposure levels that are used by the camera system.

During operation in IR mode, illumination sources 118 generate IR light that illuminates the objects in the field of view. Because the illumination sources 118 are adjacent to the image sensor 114, for example, circumferentially surrounding the image sensor at locations that are close to the optical axis 105, IR light from the illumination sources is projected along directions substantially parallel to optical axis 105. In the example illustrated in FIG. 1, IR light impinges on coffee mug 132, which is highly reflective, in a direction substantially parallel to the optical axis and is reflected back toward the camera in substantially the opposite direction. Because of the reflective nature of coffee mug 132 at infrared wavelengths, conventional cameras will decrease the exposure to prevent the pixels associated with the coffee mug from being saturated. This saturation effect can also result from objects in the field of view that are placed close to the camera and reflect a significant amount of IR light from the illumination sources as a result. In conventional systems that decrease the exposure to prevent saturation of some objects, the decrease in overall exposure may cause person 134 to be underexposed. Accordingly, visibility of the person to a user may be adversely impacted. Additionally, if computer vision (CV) detection algorithms are run on the image or a video including similar images, the algorithm's performance can be adversely impacted by the poor contrast that results from underexposure.

Accordingly, embodiments of the present disclosure provide methods and systems that address exposure-related effects that can occur when one or more objects in the field of view impact the image quality (e.g., exposure level) of other objects in the field of view. As described more fully herein, embodiments of the present disclosure utilize data collected in RGB mode to set AE parameters used during IR mode in order to emphasize regions of the field of view in which people are present, motion is occurring, or the like. By emphasizing these regions, other areas of the field of view, which may correlate with areas that would dominate the AE algorithms, are deemphasized, resulting in improved user experience and CV algorithm performance.

Figure 2:
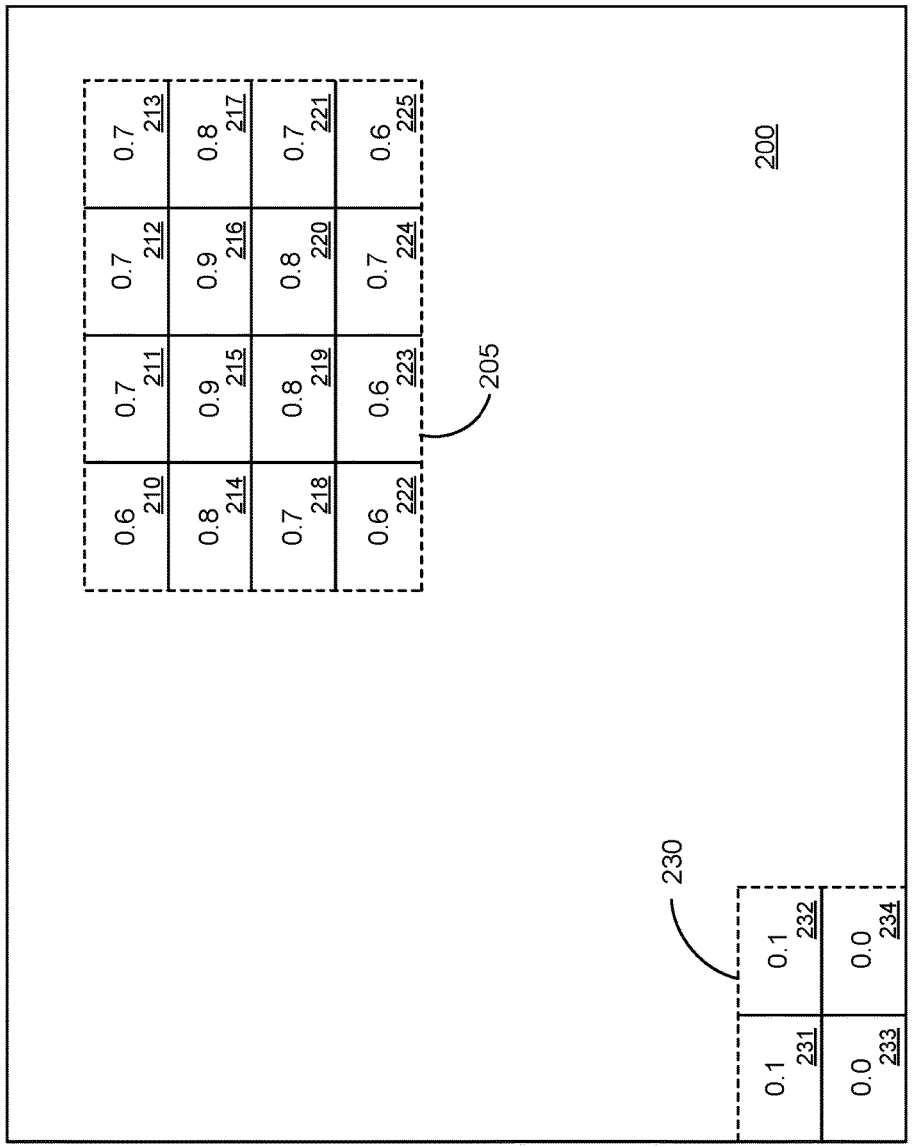
FIG. 2 illustrates an exemplary human presence heatmap according to examples of the present disclosure.

FIG. 2 illustrates an exemplary human presence heatmap according to examples of the present disclosure. Heatmap 200 corresponds to an image of the object plane 130, which corresponds to the camera's field of view. The heatmap 200 provides an activity metric (e.g., ranging from 0 to 1) associated with each pixel in the image. This activity metric is also referred to as a pixel weight, or simply a weight. The heatmap can be normalized in some embodiments by dividing all pixel weights by the maximum pixel weight. The normalization process can be performed during assignment of pixel weights or after formation of an initial heatmap that is not initially normalized. As described more fully below, normalization of the various heatmaps described herein will enable metrics operating at different scales to be combined to generate a combined heatmap that includes characteristics of the underlying heatmaps that are thus combined.

Heatmap 200 includes a first region 205 including pixels 210-215. First region 205 corresponds to the areas of the image of the object plane 130 in FIG. 1 at which person 134 is located. In some implementations, a human presence detector (not shown) is utilized to perform human presence detection. Additional description related to human presence detection is provided in commonly assigned U.S. patent application Ser. No. 15/601,752, filed on May 22, 2017, and entitled "Presence Detection and Detection Localization," the disclosure of which is hereby incorporated by reference in its entirety for all purposes. Accordingly, heatmap 200 can be referred to as a human presence heatmap ($HM_{person}$).

Referring to FIG. 2, first region 205 includes a number of pixels 210-225, each of which is assigned a weight, in this example, ranging from 0.6 to 0.9. Although given weights are illustrated, embodiments of the present disclosure are not limited to these particular weights, which are only exemplary. In operation, the human presence detector will determine areas of the image frame with an increased likelihood of a person being present. As an example, given an image frame of RGB image data, the human presence detector can generate one or more bounding boxes in which human presence is likely. Multiple bounding boxes can be combined during the process of human presence detection.

The pixels in the areas (e.g., bounding boxes) where human presence is likely, which may be overlapping, will be weighted more heavily (i.e., higher values) than pixels in areas that are not associated with human presence. As illustrated in FIG. 2, pixels 215, 216, 219, and 220 have weights of 0.8 and 0.9, including a high probability of human presence. Pixels surrounding pixels 215, 216, 219, and 220 have weights ranging from 0.6 to 0.8, indicating a significant probability of human presence, but lower, for example, than the probability associated with pixels 215 and 216. As mentioned above, the heatmap 200 can be normalized during generation or after the heatmap is generated. One of ordinary skill in the art would recognize many variations, modifications, and alternatives.

A second region 230 is also illustrated in FIG. 2 and includes a number of pixels 231-234, each of which is assigned a weight, in this example, ranging from 0.0 to 0.1. Although given weights are illustrated, embodiments of the present disclosure are not limited to these particular weights, which are only exemplary. The small weight assigned to these pixels indicates a low likelihood of a person being present, which is appropriate, since second region 230 correlates with the location of coffee mug 132 in the field of view of object plane 130 illustrated in FIG. 1.

Although some embodiments are discussed in terms of analysis of a single frame of image data, it will be appreciated that similar analysis can be performed on a plurality of frames of image data, for example, two consecutive frames, two frames separated by one or more intervening frames, or the like. For example, if the frames are captured at a rate of 30 frames per second, two frames separated by 0.2 seconds, i.e., every $6^{th}$ frame, could be utilized to generate heatmap 200. Moreover, although a small number of regions are illustrated in FIG. 2 for purposes of clarity, it will be appreciated that additional regions with varying pixel weights can be present in the heatmap 200. In particular, although only a few pixels are illustrated in FIG. 2, it will be appreciated that the heatmap will include pixel weights for each of the pixels in the frame of image data. One of ordinary skill in the art would recognize many variations, modifications, and alternatives.

Figure 3:
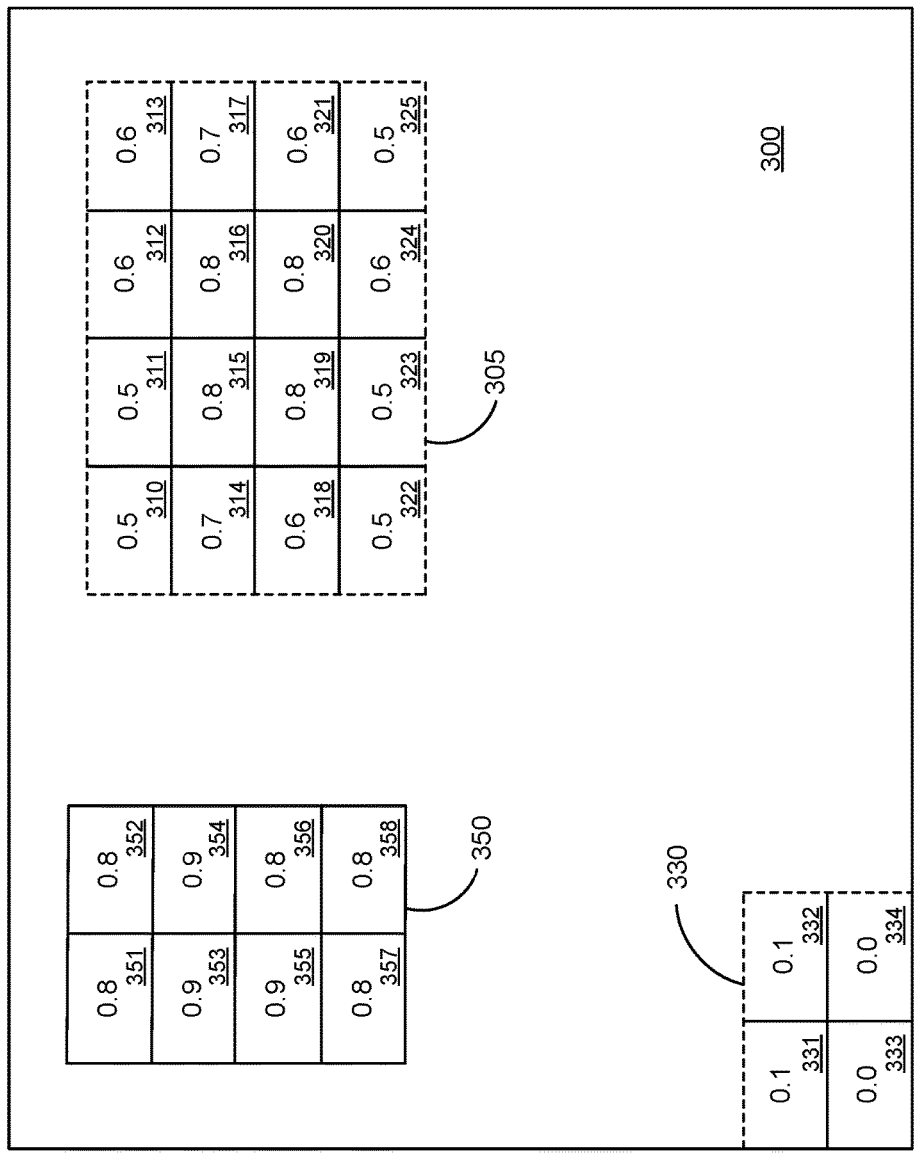
FIG. 3 illustrates an exemplary motion heatmap according to examples of the present disclosure.

FIG. 3 illustrates an exemplary motion heatmap according to examples of the present disclosure. Heatmap 300 corresponds to the image of the object plane 130, that is, the heatmap 300 provides an activity metric (e.g., ranging from 0 to 1) associated with each pixel in the image. This activity metric is also referred to as a pixel weight, or simply a weight. The heatmap can be normalized in some embodiments by dividing all pixel weights by the maximum pixel weight. The normalization process can be performed during assignment of pixel weights or after formation of an initial heatmap that is not initially normalized. As described more fully below, normalization of the various heatmaps described herein will enable metrics operating at different scales to be combined to generate a combined heatmap that includes characteristics of the underlying heatmaps that are thus combined.

Heatmap 300 includes a first region 305 including pixels 310-325. First region 305 corresponds to the areas of the image of the object plane 130 in FIG. 1 that are associated with motion of person 134. Accordingly, heatmap 300 can be referred to as a motion heatmap ($HM_{motion}$). In some implementations, a motion detector (not shown) is utilized to perform motion detection. As will be evident to one of skill in the art, motion detection for the image can be based on comparisons with earlier or subsequent images, for example, the image frame captured sequentially before the current image frame.

Referring to FIG. 3, first region 305 includes a number of pixels 310-325, each of which is assigned a weight, in this example, ranging from 0.5 to 0.8. Although given weights are illustrated, embodiments of the present disclosure are not limited to these particular weights, which are only exemplary. In operation, the motion detector will determine areas of the image frame with an increased likelihood of motion being present. As an example, given one or more image frames of RGB image data, the motion detector can generate one or more bounding boxes in which motion is likely. Multiple bounding boxes can be combined during the process of motion detection.

The pixels in the areas (e.g., bounding boxes) where motion is likely, which may be overlapping, will be weighted more heavily (i.e., higher values) than pixels in areas that are not associated with motion. As illustrated in FIG. 3, pixels 315, 316, 319, and 320 have weights of 0.8, including a high probability of motion. Pixels surrounding pixels 315, 316, 319, and 320 have weights ranging from 0.5 to 0.7, indicating a significant probability of motion, but lower, for example, than the probability associated with pixels 315, 316, 319, and 320. As mentioned above, the heatmap 300 can be normalized during generation or after the heatmap is generated. One of ordinary skill in the art would recognize many variations, modifications, and alternatives.

In addition to first region 305, in which motion has been detected, a second region 350 includes a number of pixels 351-358, each of which is assigned a weight, in this example, ranging from 0.8 to 0.9. Thus, second region 350 has a significant probability of motion, which can be associated with one or more physical objects moving as a function of time. Thus, motion associated with a person is characterized by the weights assigned to pixels in first region 305 and motion associated with objects other than a person is characterized by the weights assigned to pixels in second region 350. As an example, second region 350 could correspond to a window, with trees or vehicles moving beyond the window as a function of time.

Referring once again to FIG. 3, a third region 330 includes a number of pixels 331-334, each of which is assigned a weight, in this example, ranging from 0.0 to 0.1. The small weight assigned to these pixels indicates a low likelihood of motion being present, which is appropriate, since third region 330 correlates with the location of coffee mug 132 in the field of view of object plane 130 illustrated in FIG. 1. Accordingly, heatmap 300 includes first region 305 and second region 350, both associated with persons/objects in motion, and third region 330, associated with a static object.

Although some embodiments are discussed in terms of analysis of motion between consecutive frames of image data, it will be appreciated that similar analysis can be performed using other frames of image data, for example, two frames that are separated by one or more intervening frames. Moreover, although a small number of regions (i.e., three regions) are illustrated in FIG. 3 for purposes of clarity, it will be appreciated that additional regions with varying pixel weights can be present in the heatmap 300. One of ordinary skill in the art would recognize many variations, modifications, and alternatives.

Figure 4:
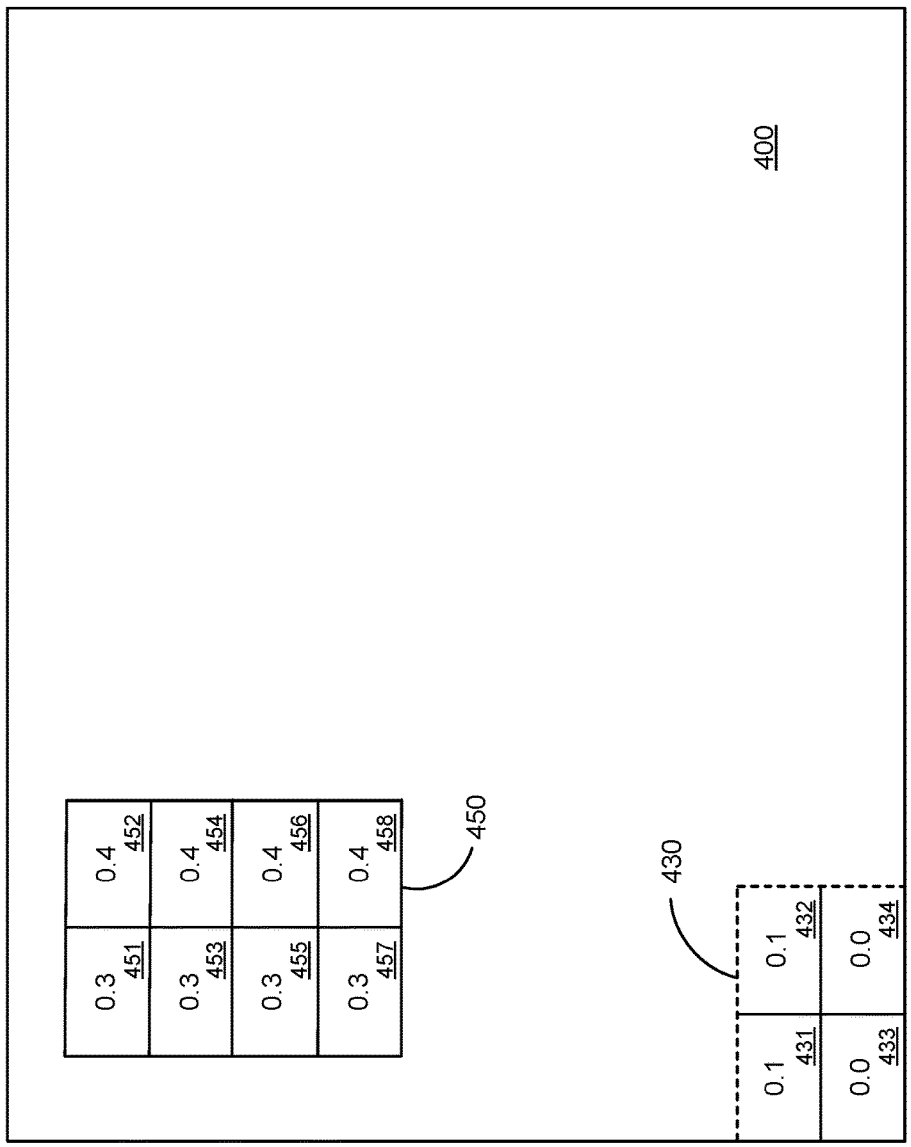
FIG. 4 illustrates an exemplary image metric heatmap according to examples of the present disclosure.

FIG. 4 illustrates an exemplary image metric heatmap according to examples of the present disclosure. In a manner similar to heatmap 200 and heatmap 300, heatmap 400 illustrated in FIG. 4 corresponds to the image of the object plane 130 and provides an activity metric (e.g., ranging from 0 to 1) associated with each pixel in the image. The activity metric in heatmap 400 corresponds to image quality, for example, a saturation level associated with each pixel. A pixel is considered saturated when it loses the ability to accommodate additional charge. For a pixel including RGB sub-pixels, a saturated pixel can appear white and have sub-pixels intensity values of (255, 255, 255) measured on a scale of 0-255. Thus, a saturated pixel is a pixel in which the sub-pixel values (e.g., one or more of the sub-pixel values) are equal to the maximum pixel intensity value. Accordingly, the saturation level of a pixel can be low if one or more of the sub-pixel values are in the low end of the scale and the saturation level of a pixel can be high if one or more of the sub-pixel values are in the high end of the scale. Accordingly, heatmap 400 can be referred to as an image quality heatmap ($HM_{IQ}$). Thus, the image metric heatmap includes a set of pixels having a normalized pixel weight between 0 and 1, with the normalized pixel weight of each pixel in the set of pixels being a function (e.g., an inversely related function) of a saturation level of a corresponding pixel in the image frame.

In some embodiments, a high saturation level (i.e., the pixel is overexposed) will result in a low activity metric (e.g., values near zero). As illustrated in FIG. 4, region 430, which correlates with the location of coffee mug 132 in the field of view of object plane 130 illustrated in FIG. 1, includes pixels 431-434, each of which is assigned a weight, in this example, ranging from 0.0 to 0.1. The small weight assigned to these pixels in the image metric heatmap indicates that this region is overexposed in the image.

As another example, if a scene includes a window that is generally brighter than other objects in the scene, heatmap 400 will weight pixels in the image associated with the window with a low weight, effectively deemphasizing these pixels. This weighting will prevent the high saturation level associated with the window from dominating the CV algorithms and other image processing functions. In FIG. 4, region 450, which corresponds to second region 350 in FIG. 2, could represent a window, which results in the low pixel weights for pixels 451-458.

In some embodiments, a histogram of the pixel intensity values can be utilized in generating heatmap 400. For instance, for a given image frame or portions of a given image frame, a histogram of the pixel intensity values (e.g., ranging from 0-255) can be formed. The histogram or changes in the histogram as a function of time can be utilized in generating heatmap 400. As an example, if the location of coffee mug 132 in the field of view of object plane 130 illustrated in FIG. 1 is static, a histogram that was created for region 430 would be substantially constant as a function of time. In this case, low weights could be assigned to the pixels in this region, indicating that region 430 will not be a significant region of interest.

The activity metric, which can be statistics related to auto-exposure parameters of the image frame, can be determined for an image frame or based on multiple image frames. In some embodiments, rather than the exposure level for a given image frame, variation of the activity metric can be tracked during a period of time, for example, consecutive frames or frames captured during a longer period such as on an hourly basis, can be monitored to generate the activity metric. In these embodiments, the variation in the auto-exposure parameters is used to generate the activity metric, with low weights associated with regions in which the auto-exposure parameters are generally constant and high weights associated with regions in which the auto-exposure parameters vary significantly. This variation can be measured in terms of differences between image frames or areas of image frames, correlation between image frames or areas of image, or the like.

Although some embodiments are described in terms of pixel-based activity metrics, it will be appreciated that multi-pixel areas can be utilized in generating the heatmap 400, with average weights being assigned to pixels in the multi-pixel area. Additionally, normalization of the activity metric can be performed.

Figure 5:
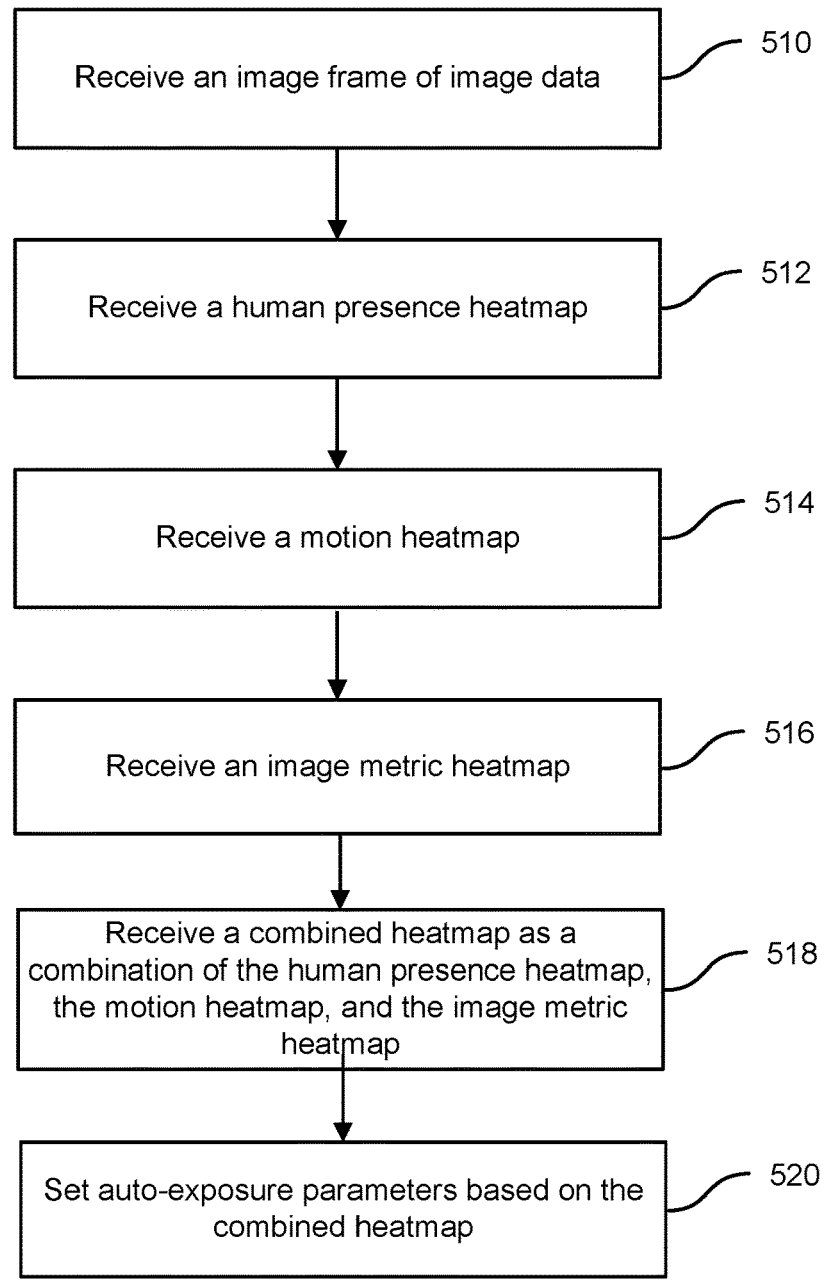
FIG. 5 is a flowchart conceptually illustrating formation of an RGB heatmap according to examples of the present disclosure.

FIG. 5 is a flowchart conceptually illustrating formation of an RGB heatmap according to examples of the present disclosure. The RGB heatmap, which can also be referred to as a combined heatmap, is formed using the heatmaps previously discussed. The method of forming an RGB heatmap includes receiving an image frame of image data associated with a camera, for example, a video camera (510). The method can include receiving a plurality of image frames and the present disclosure is not limited to receipt of a single image frame. The method also includes receiving a human presence heatmap for the image frame (512), receiving a motion heatmap for the image frame (514), and receiving an image metric heatmap for the image frame (516). The various heatmaps can be generated using processor 120, generated by other processors accessible through I/O interface 124, for example, cloud processors, or using combinations thereof. Thus, receiving a heatmap can be understood to include generating the heatmap locally or receiving the heatmap after remote generation. For instance, the motion heatmap and the image metric heatmap could be generated locally using processor 120 while the human presence heatmaps is generated in the cloud. Similarly, one or more heatmaps could be generated locally and transmitted through I/O interface 124, with other heatmaps and the combined heatmap generated remotely. Thus, embodiments provide for local processing, remote or distributed processing, or combinations thereof.

As discussed above in relation to FIG. 2 above, generating the human presence heatmap can include weighting pixel values in one or more regions of the image frame that are associated with human presence higher than other pixel values in regions of the image frame in which the likelihood of human presence is lower. Accordingly, as illustrated in FIG. 2, first region 205 includes pixels with higher weights than pixels in areas that are not associated with human presence. As discussed in relation to FIG. 3 above, generating the motion heatmap can include detecting motion in one or more additional regions of the image frame and weighting pixel values in the one or more additional regions higher than pixel values in regions in which motion is not detected. As discussed in relation to FIG. 4 above, generating the image metric heatmap can include determining a set of pixels in the image frame with a high saturation level (including being saturated) and weighting pixel values for the pixels with a high saturation level lower than pixels with a low saturation level.

Given heatmap 200 ($HM_{person}$), heatmap 300 ($HM_{motion}$) and heatmap 400 ($HM_{IQ}$), embodiments of the present disclosure receive a combined heatmap ($HM_{combined}$) as:

$$HM_{Combined} = \alpha * HM_{person} \beta * HM_{motion} + \gamma * HM_{IQ}, \quad (1)$$

where $\alpha$, $\beta$, and $\gamma$ are coefficients (518). As discussed above, the combined heatmap can be generated locally using processor 120 or remotely. The coefficients in equation (1) can be selected to emphasize one or more of the underlying heatmaps and their associated activity, for example, human presence detection through heatmap 200 and motion through heatmap 300, which may improve IR operation as described below. In an implementation, a machine learning algorithm can be utilized to determine coefficients that produce image frames with the desired image quality. As an example, by collecting many scenes from many cameras in many different operating environments, selection of values for the coefficients can be used to achieve desired image quality metrics. Alternatively, such data could be processed by a machine learning algorithm to select the values of the coefficients.

The combined heatmap thus emphasizes areas of the image frame that have high likelihoods of human presence and/or motion and are characterized by high image quality. Although a linear combination is illustrated in equation (1), this is not required by the present disclosure and other combinations of the underlying heatmaps can be utilized to generate the combined heatmap. It will also be appreciated that although a combined heatmap can be generated for each image frame, the underlying heatmaps can be generated using multiple image frames. Moreover, either the underlying heatmaps or the combined heatmap can be averaged over time during the heatmap generation process. One of ordinary skill in the art would recognize many variations, modifications, and alternatives.

Referring once again to FIG. 5, the method includes defining or setting auto-exposure parameters for the camera based on the combined heatmap (520). As an example, the auto-exposure metering table can be formed by auto-exposure blocks, for instance 40×30 pixels in size for a 4:3 aspect ratio image frame. Each auto-exposure block can have a variety of AE statistics and/or an exposure setting ranging from 1-15. The AE-statistics can include metrics on the brightness of the block, the histogram, and the like. The average weight of the pixels in the auto-exposure block can be determined (i.e., average block weight) and the exposure setting of the auto-exposure block can be set as a function of the average block weight. For 15 auto-exposure settings, average block weights in bins of ~0.067 will be used to define the 15 levels of the auto-exposure setting ranging from zero to one. Accordingly, auto-exposure blocks with a high average block weight will receive a high auto-exposure setting and auto-exposure blocks with a low average block weight will receive a low auto-exposure setting. In other embodiments, other methods are utilized to set the auto-exposure parameters using the combined heatmap.

Since the combined heatmap emphasizes the areas of the image frame with a high likelihood of being important to the viewer or CV algorithms, the combined heatmap can be used to weight the AE statistics associated with the auto-exposure metering table. As an example, given the combined heatmap, the AE statistics in each block can be multiplied by averaged values from the combined heatmap for the pixels in the block, producing weighted AE statistics for each block. In a particular embodiment, the exposure setting for each block is multiplied by the averaged values from the combined heatmap for the pixels in each block to produce a weighted exposure setting for each block. In this manner, the combined heatmap has been used to decrease the weight of the exposure setting for blocks in regions of low interest. In an embodiment, the weighted exposure setting for the blocks can be added to provide a single number that is compared to a target value (i.e., AE target). If the result is below the target value, the exposure can be increased and if the result is higher than the target value, the exposure can be decreased.

As discussed above, embodiments can utilize local or remote processing, or combinations thereof, to generate the various heatmaps. In a similar manner, local or remote processing, or combinations thereof, can be used to define the auto-exposure settings. If the combined heatmap is generated remotely, the combined heatmap can be provided to processor 120 to define the auto-exposure settings. Alternatively, the auto-exposure settings could be defined remotely and provided to camera system 100.

As discussed above, the camera is capable of operating both in RGB mode and IR mode. Separate AE parameter settings can be utilized in conjunction with each of these modes of operation. RGB AE settings refer to AE parameters that are used when the camera is operating in the RGB mode and IR AE settings refer to AE parameters that are used when the camera is operating in the IR mode. In some embodiments, the IR AE settings are defined using the combined heatmap. The image data can include RGB image data and the auto-exposure parameters can include infrared auto-exposure parameters. In some implementations, infrared illumination light can be generated and one or more infrared image frames can be received using the auto-exposure parameters defined.

In some embodiments, information provided in conjunction with the underlying heatmaps can be utilized, for example, by CV algorithms. As an example, if a region of interest is present in one heatmap (e.g., the motion heatmap), but continually missing in another heatmap (e.g., the human presence heatmap), CV algorithms can utilize this information. For instance, if vehicles are driving through a region of interest on a regular or irregular basis, resulting in high pixel weights for the motion heatmap in this region of interest, but people are not detected in this region of interest, it can be concluded that notifications based on motion may be reduced in frequency since a user may be more interested in being notified when people are moving through the scene rather than when vehicles are moving through the scene. Similarly, if a tree is moving in an area of the scene, which will result in a region of interest in the motion heatmap, but not in the human presence heatmap, this motion can be discounted by appropriate CV algorithms.

Some or all of the process 500 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 6:
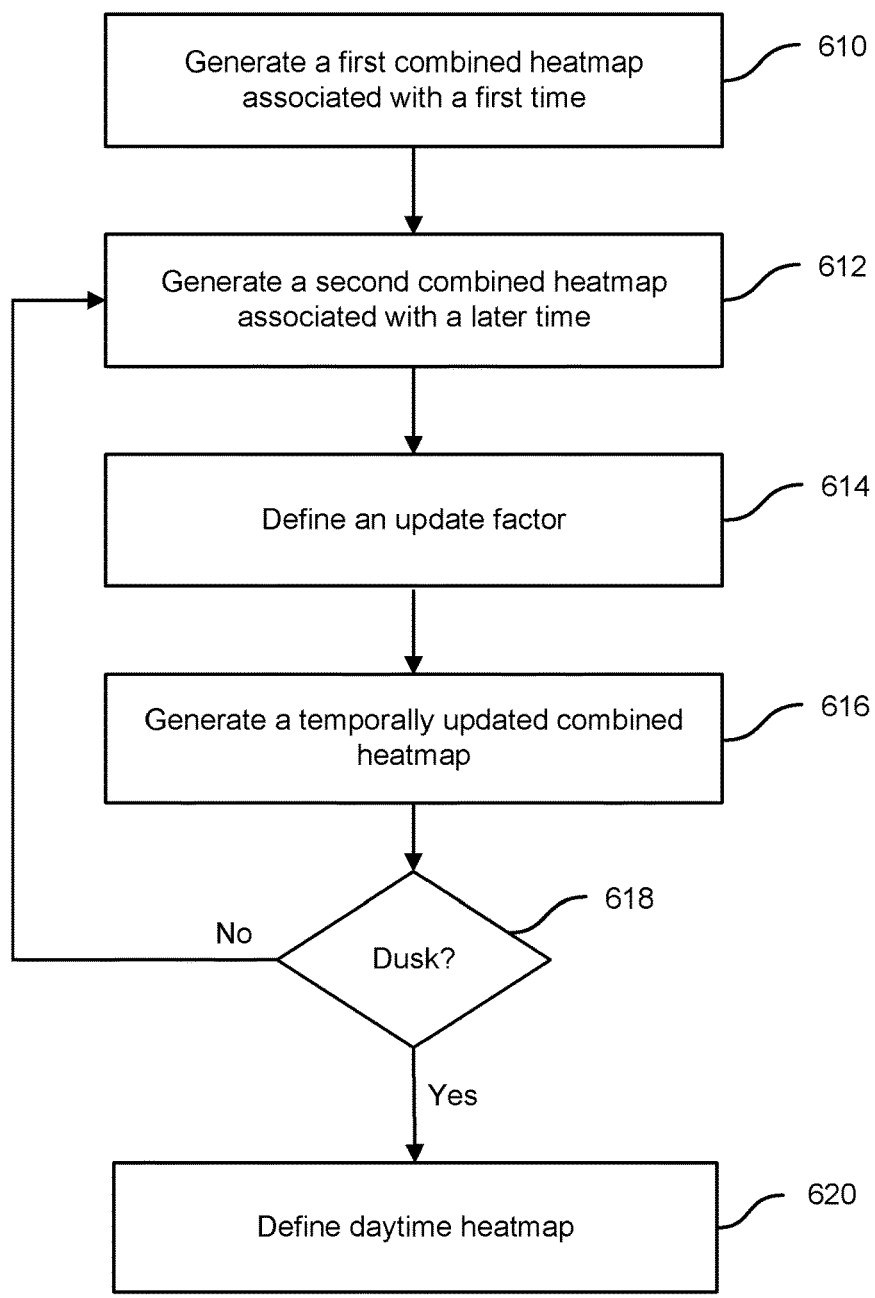
FIG. 6 is a flowchart conceptually illustrating updating of an RGB heatmap according to examples of the present disclosure.

FIG. 6 is a flowchart conceptually illustrating updating of an RGB heatmap (also referred to as a daytime heatmap) according to examples of the present disclosure. In order to address temporal variations in the scene throughout a day, some embodiments implement a temporal update of the combined heatmap as:

$$HM'_{Combined}(t)=\delta*HM_{Combined}(t-1)+(1-\delta)*HM_{Combined}(t), \qquad (2)$$

where $\delta$ is an update factor.

In FIG. 6, a first combined heatmap associated with a first time (i.e., $HM_{combined}(t-1)$) is generated (610). The first combined heatmap can be generated as discussed in relation to FIG. 5. At a second time, e.g., later than the first time, a second combined heatmap ($HM_{Combined}(t)$) is generated (612). The second combined heatmap will vary from the first combined heatmap as a function of changes in the underlying heatmaps, providing a moving average. As an example, if motion in the image frame occurs between the first and second times, this motion and the region associated with the motion will impact the pixel weights in the second combined heatmap. An update factor $\delta$ is defined (614) and will typically be close to one, for example, in the range of 0.9999, thereby heavily weighting the existing heatmap. Accordingly, small variations in the underlying heatmaps over time will not be overemphasized.

The updating can continue throughout the day, for example, by determining that it is not dusk (618), and generating an additional combined heatmap (612), and performing an additional update (616). Although dusk is utilized in the embodiment illustrated in FIG. 6, other metrics for determining the number of updates to perform can be utilized. In operation, the updating of the combined heatmap in accordance with equation (2) will enable the RGB data collected throughout the day to be used in generating a final combined heatmap, which can be referred to as a daytime heatmap ($HM_{Day}=HM_{Combined}(t=dusk)$) (620). The temporal update through equation (2) can be run on all image frames, or periodically on a subset of the total number of image frames. Moreover, the update factor defined at 614 can be varied as a function of time to emphasize periods during the day during which improved image quality is expected, or the like.

The daytime heatmap ($HM_{Day}$) can be utilized to set AE parameters for the camera system that are then utilized during IR operation at night. Since the daytime heatmap emphasizes regions of interest (i.e., areas where the pixel weights are highest) that are associated with human presence, motion, and high image quality, the exposure settings during IR operation will emphasize these regions of interest, preventing underexposure of these regions of interest that can result from overexposure of areas outside the regions of interest. In the example illustrated in FIG. 1, the saturation of pixels associated with coffee mug 132 can result, in conventional systems, in underexposure of pixels associated with person 134. Embodiments described herein will adjust the AE parameters in order to increase the exposure of pixels associated with person 134, even though this may result in additional overexposure in areas outside the regions of interest, for example, the area including coffee mug 132. Accordingly, embodiments of the present disclosure improve the exposure in the regions of interest, which enables CV algorithms and other procedures to be performed with improved performance.

As an example of setting the AE parameters for the camera system, the daytime heatmap can be used to set the parameters of the AE metering table (similar to settings used for spot metering vs. center weighted metering). In this example, the setting of the parameters can be granular and dynamic since they are based on the heatmap information. As a result, over saturation or under saturation of the regions of interest can be reduced or eliminated since the parameters are defined in relation to the daytime heatmap. Alternatively, local tone mapping can be defined using the daytime heatmap in order to provide sufficient levels of brightness in the regions of interest. For example, if a dark region is associated with low values in the heatmap, then the local tone mapping strength can be reduced, which will reduce noise levels in the images obtained by the camera system.

In some embodiments, the combined heatmap is utilized to define regions of focus, which are areas that include pixels with high weights (e.g., pixel weights over a predetermined threshold, for instance 0.9), which are defined as center pixels, and pixels with weights within a predetermined amount of the center pixel (e.g., pixel weights within 10% or 20% of the predetermined threshold). In other embodiments, for example, in implementations of area cropping, pixels with a weight over a threshold could be included in an area of interest. In an interactive implementation, a slider can be provided that sets the threshold value, with pixels having weights greater than the threshold being included in the area of interest.

Given the updated AE metering tables, IR image frames will be captured with AE settings that are based on the daytime heatmap (also referred to as an RGB heatmap). Accordingly, these IR image frames, which would conventionally have AE settings based on IR image frames, will have improved exposure in the regions of interest. The IR image frames can then be processed using CV algorithms and other processing techniques. In addition to improved performance of CV algorithms, the embodiments described herein improve the user experience since the regions associated with people and motion are emphasized in setting the AE parameters. It should be appreciated that the daytime heatmap can be utilized as inputs to CV algorithms, which can then focus their processing on the regions of interest.

In addition to use of the RGB heatmap to derive values for the infrared auto-exposure parameters for the video camera, the RGB heatmap can be used during live viewing of a scene to crop the scene (e.g., automatically). This cropping of the scene will show the user only specific areas of interest, which can also be referred to as activity areas. Alternatively, in order to reduce notifications to the user, the RGB heatmap could be used to suggest (e.g., automatically) zones that can be ignored by the user, thereby resulting in a reduced number of notifications. Moreover, the RGB heatmap can be used to drive spatial tuning for the sensitivity settings. For example, when a user applies a lower sensitivity setting, higher thresholds can be applied in relation to CV detection processes. This will modify the sensitivity in zones of activity based on the RGB heatmap in comparison with the use of global thresholds. In this implementation, the RGB heatmap provides a reliable indication of human presence and long term activity focus.

It should be appreciated that the generation of the daytime heatmap can be repeated on a daily basis. After the AE parameters are set for the night and IR image frames are received under IR illumination, the process of generation of the daytime heatmap can be repeated using RGB images obtained during the next day. In other embodiments, if RGB images are available during the night as a result of white light illumination, these RGB images can be used to generate a new combined heatmap or can be used to provide additional temporal updates to the combined heatmap in accordance with the temporal update process discussed in relation to equation (2). One of ordinary skill in the art would recognize many variations, modifications, and alternatives.

Some or all of the process 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 7:
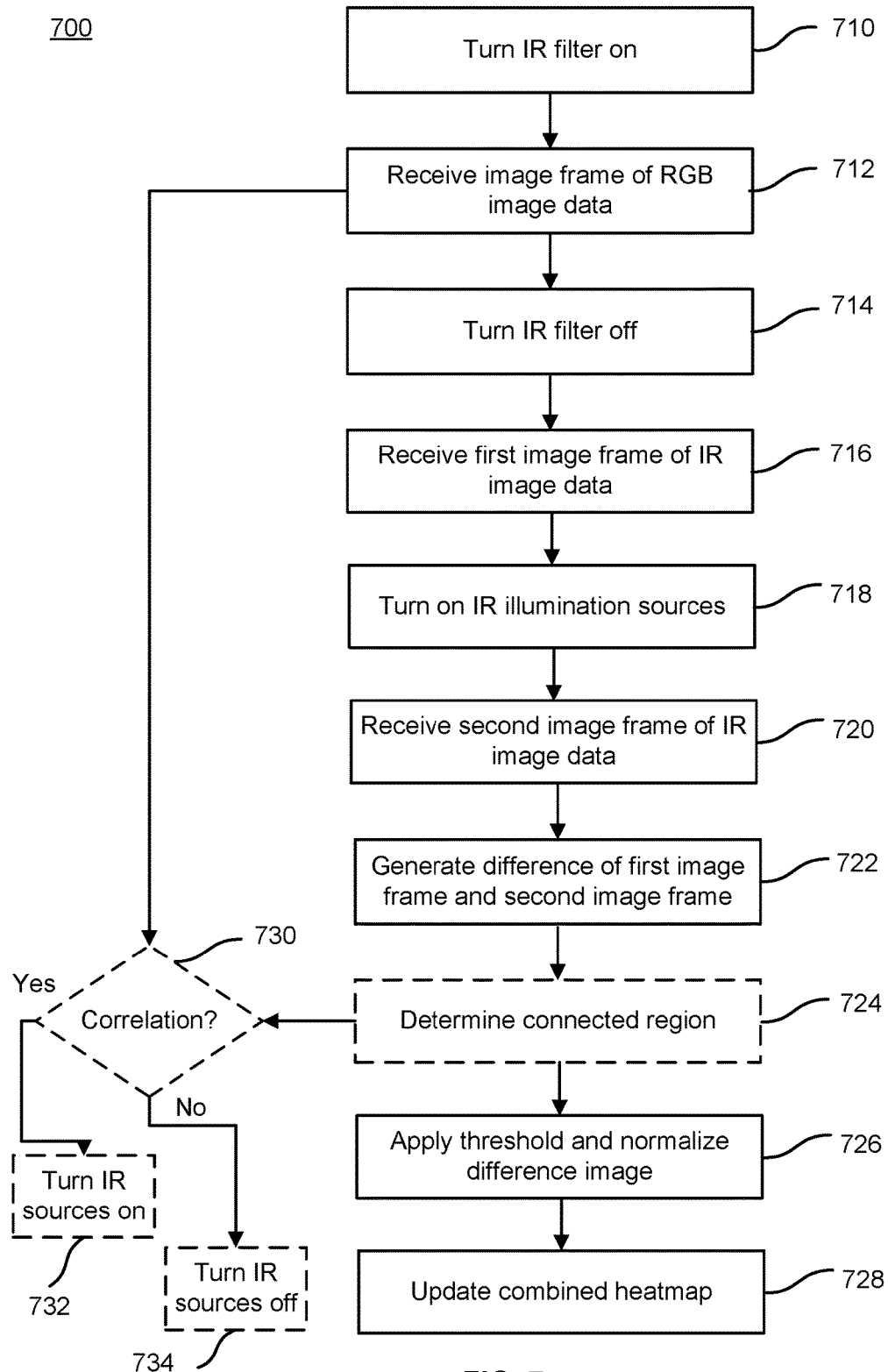
FIG. 7 is a flowchart conceptually illustrating updating of an RGB heatmap using an IR heatmap according to examples of the present disclosure.

FIG. 7 is a flowchart conceptually illustrating updating of an RGB heatmap using an IR heatmap according to examples of the present disclosure. The method 700 illustrated in FIG. 7 can be implemented at times surrounding dusk, when RGB images are still available, but IR images can also be obtained. Referring to FIG. 7, the method includes turning on the IR filter (710). In this mode of operation, IR light will be blocked by the IR filter, allowing visible wavelengths to be imaged in RGB mode. The method also includes receiving an image frame of RGB image data (712). The IR filter is turned off or removed, which enables IR wavelengths to be imaged in the IR mode (714). Turning the IR filter off may optionally be accompanied by turning off the IR illumination sources, which may already be in the off state.

A first image frame of IR image data is received (716). The IR illumination sources (e.g., illumination sources 118 in FIG. 1) are then turned on (718) and a second image frame of IR image data is received (720). Thus, the method includes receiving IR image data under both ambient light conditions (716) and under illuminated conditions (720). Using the first image frame of IR image data obtained under ambient light conditions and the second image frame of IR image data obtained under illuminated conditions, a difference image is computed as the difference between the first image frame and the second image frame (722).

Since objects with high reflectivity or high brightness under IR illumination, which can potentially result in underexposure of regions of interest, will be emphasized in the second image frame, but not the first image frame, subtraction or other comparison of the first and second image frames will result in a difference image that has low weights on these high reflectivity/brightness objects. For instance, if the second image frame is subtracted from the first image frame (on a pixel-by-pixel basis), the high pixel intensities in the second image frame will result in negative pixel values in the difference image. These negative pixel values, for example, values less than a threshold, can indicate that a low weight should be placed on these pixel values when setting the AE parameters.

Accordingly, objects that will typically be overexposed, for instance, reflective objects that are close to the camera system or other objects that have high reflectance, will have low pixel intensity in the first image frame obtained under ambient light conditions, but higher pixel intensity in the second image frame as a result of the IR illumination. Taking coffee mug 132 in FIG. 1 as an example, the first image frame will have low pixel intensities in the region associated with the coffee mug, whereas the second pixel frame will have comparatively higher pixel intensities in this region. In the difference image, regions with differing pixel intensity will be highlighted. In contrast, regions that have similar pixel intensities, under both ambient light and illuminated conditions, will have pixel values near zero in the difference image. Accordingly, areas that are likely to be overexposed and saturated will be highlighted by the difference image.

A threshold is applied to the difference image and the difference image is normalized to provide a difference heatmap ($HM_{Diff}$) with values that are in a predetermined range (e.g., from zero to one) (726). In addition to highlighting areas that typically are overexposed, application of a threshold can be used to reduce noise in the difference image. The difference image heatmap is then used to update the combined heatmap (728). Updating of the combined heatmap can be performed as:

$$HM'_{Combined} = \kappa * HM_{Combined} + \lambda * HM_{Diff}. \quad (3)$$

where $\kappa$ and $\lambda$ are coefficients.

The updated heatmap can then be utilized to set the AE parameters and the discussion related to the use of the combined heatmap in setting AE parameters is applicable to the use of the heatmap updated using the difference heatmap as appropriate.

Although variation of IR illumination intensity as either off or on is discussed in relation to FIG. 7, embodiments are not limited to these two illumination options and variable IR illumination intensity can be utilized to obtain a series of IR image frames with varying IR illumination intensity, a series of corresponding heatmaps, and a difference heatmap based on the series of corresponding heatmaps. One of ordinary skill in the art would recognize many variations, modifications, and alternatives.

In another embodiment, the difference heatmap ($HM_{Diff}$) is utilized in conjunction with other underlying heatmaps to generate a modified, combined heatmap ($HM'_{Combined}$) as:

$$HM'_{Combined} = \alpha * HM_{person} + \beta * HM_{motion} + \gamma * HM_{IQ} + \chi * HM_{Diff}. \quad (4)$$

where $\chi$ is an additional coefficient.

Referring once again to FIG. 7, an optional process is utilized to determine if improved performance can be achieved during IR operation with the IR illumination sources turned off. An example of using this optional process would be to distinguish a glass window directly in front of the camera system. In this case, the IR illumination sources can produce a bright reflection in the shape of a ring that will be generally centered in the image frame. This bright reflection may result in other areas of the image frame being underexposed.

As illustrated in FIG. 7, the method may include determining a connected region (724). As an example, a connected region could be an area of the difference image that is characterized by large difference values. A threshold could be applied to determine connected regions of a predetermined size to distinguish objects of interest in the image frame. This process will reduce the impact of noise sources that are small enough to not form a connected region.

A similarity measure is applied to the image frame of RGB image data obtained at process 712 and the difference image to determine if a correlation exists between the shape of the connected region and shapes present in the RGB image data (730). If there is a high correlation (i.e., common shapes appear in both of the images), the IR illumination sources are turned on (732) since the high correlation indicates that the common shapes are present independent of the IR illumination sources. Alternatively, if the correlation is low (i.e., a connected region determined at 724 is only present in the difference image), the IR illuminations sources are turned off (734). Continuing with the example discussed above, the ring-shaped reflection, which results from reflection of the IR illumination sources, indicates that this connected region is not present in the scene, but only an artifact of the illumination. Accordingly, the IR illumination sources are turned off to prevent this reflection from degrading the image quality.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moreover, it is possible in some embodiments to update the combined heatmap using heatmaps generated using IR images received under IR illumination. As an example, by generating an IR human detection heatmap ($HM_{person-IR}$), presence of people in an image frame obtained under IR illumination can be utilized to emphasize areas associated with this human activity. By generating an IR motion heatmap ($HM_{motion-IR}$), motion present under IR illumination can be utilized to emphasize areas associated with this motion. In these embodiments, the updating of the combined heatmap would be performed as illustrated in FIG. 8.

Figure 8:
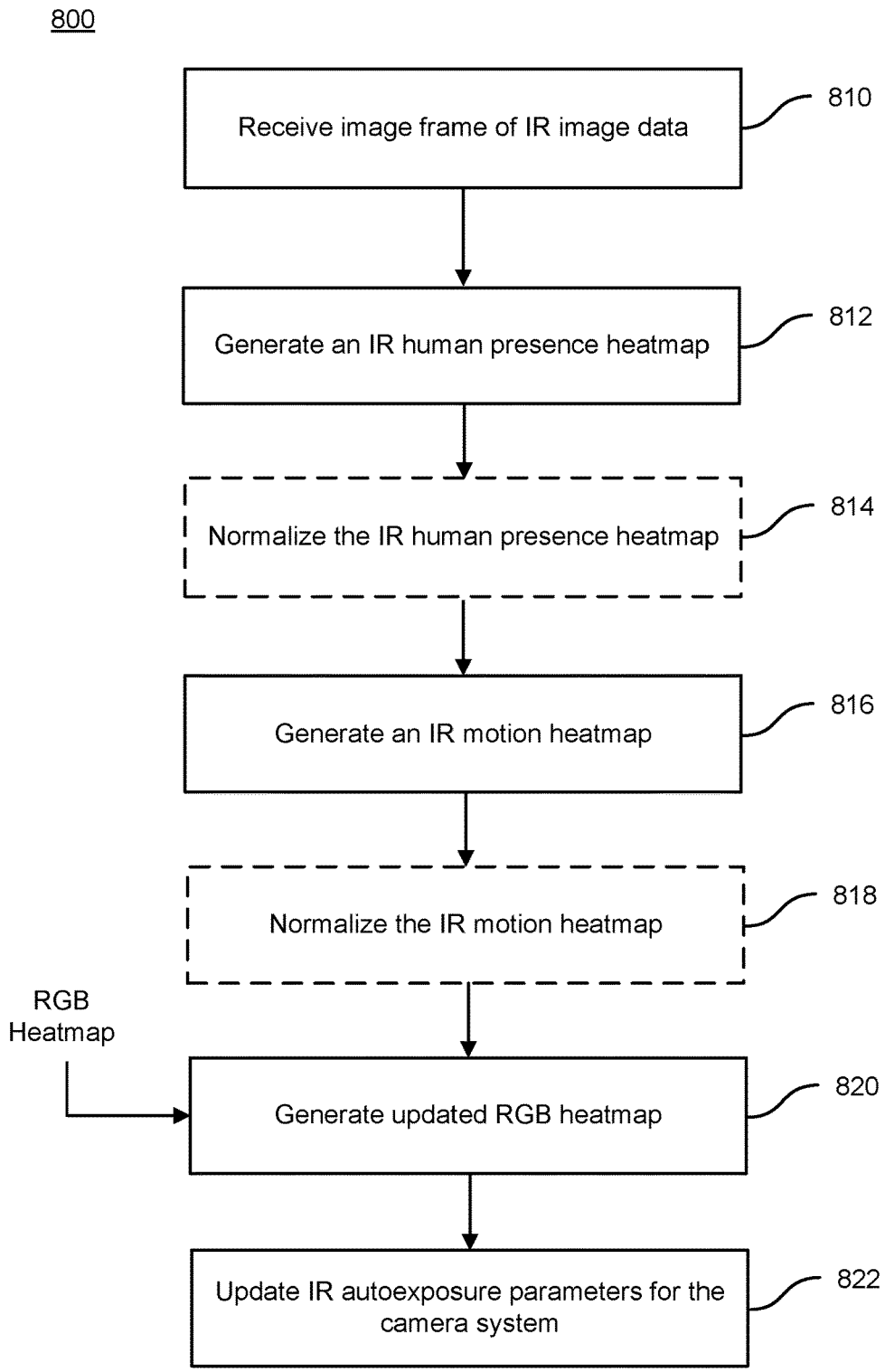
FIG. 8 is a flowchart conceptually illustrating updating of an RGB heatmap using IR heatmaps according to examples of the present disclosure.

FIG. 8 is a flowchart conceptually illustrating updating of an RGB heatmap using IR heatmaps according to examples of the present disclosure. Referring to FIG. 8, an image frame of IR image data, which can be one of a series of IR images, for example, in the form of IR video, is received (810). The image frame of IR image data can be received by a camera system (e.g., a video camera system) including IR illuminators as illustrated in FIG. 1. Using the one or more IR images, an IR human presence heatmap is generated (812). Discussion provided in FIG. 2 in relation to the generation of an RGB human presence heatmap is applicable as appropriate to the generation of the IR human presence heatmap. The IR human presence heatmap can be normalized in some embodiments by dividing all pixel weights by the maximum pixel weight (814). The normalization process can be performed during assignment of pixel weights or after formation of an initial heatmap that is not initially normalized.

Additionally, using the one or more IR images, an IR motion heatmap is generated (816). In a manner similar to the IR human presence heatmap, the discussion provided in FIG. 3 in relation to the generation of an RGB motion heatmap is applicable as appropriate to the generation of the IR motion heatmap, including normalization (818) either during assignment of pixel weights or after formation of an initial heatmap that is not initially normalized.

Given an RGB heatmap, which can be the final RGB heatmap generated during RGB imaging and before IR illumination commenced, a temporal update to the RGB heatmap is made using the IR human presence heatmap and the IR motion heatmap (820). The temporal update of the RGB heatmap to form the updated RGB heatmap ($HM_{RGB'}$) can be implemented as:

$$HM_{RGB'} = \delta * HM_{RGB} + (1-\delta) * (\eta * HM_{person-IR} + \theta * HM_{motion-IR}), \quad (5)$$

where $\delta$ is an update factor and $\eta$ and $\theta$ are coefficients. In operation, the updating of the RGB heatmap in accordance with equation (5) will enable the RGB data collected throughout the day to be used in conjunction with the IR image data to generate an updated heatmap. The update factor $\delta$ will typically be in the range of 0.999, controlling the impact of the updates based on the IR image data, for example, effectively an order of magnitude less than the updates of the daytime heatmap during the day. The temporal update through equation (5) can be run on all IR image frames, or periodically on a subset of the total number of IR image frames. Moreover, the update factor can be varied as a function of time to emphasize periods during the night during which improved image quality is expected, or the like. The updated heatmap can then be used to update values for the infrared auto-exposure parameters for the camera system using the updated heatmap.

Thus, embodiments provide not only methods for generating a daytime heatmap and setting AE parameters using the daytime heatmap, but also for receiving one or more IR image frames, generating nighttime heatmap(s) using the one or more IR image frames, updating the daytime heatmap using the nighttime heatmap(s), and updating the AE parameters using the updated heatmap. In some embodiments, the nighttime updating of the daytime heatmap is limited to ensure that the AE parameters do not shift significantly from those set using the daytime heatmap.

Some or all of the process 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of setting infrared auto-exposure parameters for a video camera, comprising:
    receiving a first image frame of RGB image data;
    receiving a second image frame of RGB image data, the second image frame of RGB image data including a plurality of pixels;
    determining that data in a first region of the second image frame indicates human presence in the first region, wherein the first region is defined by a first group of pixels of the plurality of pixels;

generating a human presence heatmap associated with the first region, wherein each pixel of the first group has a normalized pixel weight between 0 and 1;

determining, using the first image frame and the second image frame, motion in a second region of the second image frame, wherein the second region is defined by a second group of pixels of the plurality of pixels;

generating a motion heatmap associated with the second region, wherein each pixel of the second group of pixels has a normalized pixel weight between 0 and 1;

determining a group of saturated pixels in the second image frame, wherein the group of saturated pixels is characterized by a maximum pixel intensity value;

generating an image quality heatmap associated with the group of saturated pixels, wherein each pixel of the group of saturated pixels has a normalized pixel weight between 0 and 1;

generating a combined heatmap by summing:
  a first coefficient between zero and one multiplied by the normalized pixel weights of each pixel of the human presence heatmap;
  a second coefficient between zero and one multiplied by the normalized pixel weight of each pixel of the motion heatmap; and
  a third coefficient between zero and one multiplied by the normalized pixel weight of each pixel of the image quality heatmap; and
deriving values for the infrared auto-exposure parameters for the video camera using the combined heatmap.

2. The computer-implemented method of claim 1, further comprising performing a temporal update to the combined heatmap comprising:
  generating a second combined heatmap by summing:
    the first coefficient multiplied by pixel weights of each pixel of a second human presence heatmap for a third image frame;
    the second coefficient multiplied by pixel weights of each pixel of a second motion heatmap for the third image frame; and
    the third coefficient multiplied by pixel weights of each pixel of a second image quality heatmap;
  generating an updated combined heatmap by summing:
    an update factor multiplied by pixel weights of each pixel of the combined heatmap; and
    the second combined heatmap minus the update factor multiplied by the second combined heatmap.

3. The computer-implemented method of claim 1, wherein an auto-exposure metering table comprises a plurality of auto-exposure blocks, each having an exposure setting, wherein deriving values for the infrared auto-exposure parameters comprises averaging, for pixels in each of the plurality of auto-exposure blocks, pixel weights of pixels in the combined heatmap to determine a corresponding block average, and multiplying the exposure setting for the plurality of auto-exposure blocks times the corresponding block average.

4. The computer-implemented method of claim 1, further comprising:
  receiving a first infrared image frame of infrared image data;
  receiving a second infrared image frame of infrared image data;
  generating an infrared human presence heatmap using the second infrared image frame;
  generating an infrared motion heatmap using the first infrared image frame and the second infrared image frame;
  updating the combined heatmap using the infrared human presence heatmap and the infrared motion heatmap to provide an updated combined heatmap; and
  updating the values for the infrared auto-exposure parameters for the video camera using the updated combined heatmap.

5. A computer-implemented method, comprising:
  receiving an image frame of image data associated with a camera;
  receiving a human presence heatmap for the image frame;
  receiving a motion heatmap for the image frame;
  receiving an image metric heatmap for the image frame;
  receiving a combined heatmap as a combination of the human presence heatmap, the motion heatmap, and the image metric heatmap; and
  setting auto-exposure parameters for the camera based on the combined heatmap.

6. The computer-implemented method of claim 5, wherein the camera comprises a video camera, the method further comprising receiving additional image frames of image data, generating additional combined heatmaps using the additional image frames of image data, and defining updated auto-exposure parameters for the camera based on the combined heatmap.

7. The computer-implemented method of claim 5, wherein the image data comprises RGB image data and the auto-exposure parameters comprise infrared auto-exposure parameters.

8. The computer-implemented method of claim 5, wherein the human presence heatmap comprises one or more regions of the image frame including pixels having a normalized weight between 0 and 1.

9. The computer-implemented method of claim 5, wherein the motion heatmap comprises one or more additional regions of the image frame associated with motion and including pixels having a normalized weight between 0 and 1.

10. The computer-implemented method of claim 5, wherein the image frame includes a set of saturated pixels characterized by a maximum pixel intensity value and wherein the image metric heatmap comprises a set of pixels having a normalized pixel weight between 0 and 1, each of the pixels in the set of pixels being associated with one of the saturated pixels in the set of saturated pixels.

11. The computer-implemented method of claim 5, wherein the image metric heatmap comprises a set of pixels having a normalized pixel weight between 0 and 1, wherein the normalized pixel weight of each pixel in the set of pixels is a function of a saturation level of a corresponding pixel in the image frame.

12. The computer-implemented method of claim 5, further comprising receiving an infrared image frame associated with a scene illuminated with infrared illumination light from one or more infrared illumination sources coupled to the camera.

13. The computer-implemented method of claim 5, wherein
  generating the combined heatmap comprises adding:
  a first coefficient multiplied by the human presence heatmap;
  a second coefficient multiplied by the motion heatmap; and
  a third coefficient multiplied by the image metric heatmap.

14. A video camera system comprising:
  an optical imaging lens;
  an image sensor;

a plurality of infrared illumination sources;

at least one processor; and a data storage device in communication with the at least one processor, wherein the data storage device comprises instructions stored thereon that, when executed by the at least one processor, cause the at least one processor to:

receive a plurality of image frames of image data captured by the image sensor;

generate a human presence heatmap for one of the plurality of image frames;

generate a motion heatmap for the one of the plurality of image frames using a second one of the plurality of image frames preceding the one of the plurality of image frames;

generate an image metric heatmap for the one of the plurality of image frames;

generate a combined heatmap as a combination of the human presence heatmap, the motion heatmap, and the image metric heatmap; and define infrared auto-exposure parameters for the video camera system based on the combined heatmap.

15. The video camera system of claim 14, wherein generating the human presence heatmap comprises instructions stored on the data storage device that, when executed by the at least one processor, cause the at least one processor to:

weight pixel values in one or more regions of the one of the plurality of image frames associated with human presence with a normalized pixel weight between 0 and 1.

16. The video camera system of claim 14, wherein generating the motion heatmap comprises instructions stored on the data storage device that, when executed by the at least one processor, cause the at least one processor to:

weight pixel values in one or more additional regions of the one of the plurality of image frames associated with motion with a normalized pixel weight between 0 and 1.

17. The video camera system of claim 14, wherein generating the image metric heatmap comprises instructions stored on the data storage device that, when executed by the at least one processor, cause the at least one processor to:

determine a saturation level for pixels in the one of the plurality of image frames; and weight pixel values for the pixels in the image metric heatmap with a normalized weight between 0 and 1, wherein the pixel values are inversely related to the saturation level of the pixels in the one of the plurality of image frames.

18. The video camera system of claim 14, wherein generating the combined heatmap comprises instructions stored on the data storage device that, when executed by the at least one processor, cause the at least one processor to add:

a first coefficient multiplied by the human presence heatmap;

a second coefficient multiplied by the motion heatmap; and a third coefficient multiplied by the image metric heatmap.

19. The video camera system of claim 18, wherein the data storage device further comprises instructions stored thereon that, when executed by the at least one processor, cause the at least one processor to:

generate a second combined heatmap by summing:

the first coefficient multiplied by pixel weights of each pixel of a second human presence heatmap for a third image frame;

the second coefficient multiplied by pixel weights of each pixel of a second motion heatmap for the third image frame; and the third coefficient multiplied by pixel weights of each pixel of a second image metric heatmap for the third image frame;

generate an updated combined heatmap by summing:

an update factor multiplied by pixel weights of each pixel of the combined heatmap; and the second combined heatmap minus the update factor multiplied by the second combined heatmap.

20. The video camera system of claim 14, wherein the data storage device further comprises instructions stored thereon that, when executed by the at least one processor, cause the at least one processor to:

receive a first infrared image frame of infrared image data;

receive a second infrared image frame of infrared image data;

generate an infrared human presence heatmap using the second infrared image frame;

generate an infrared motion heatmap using the first infrared image frame and the second infrared image frame;

update the combined heatmap using the infrared human presence heatmap and the infrared motion heatmap to provide an updated combined heatmap; and update the infrared auto-exposure parameters for the video camera system using the updated combined heatmap.

* * * * *